United States Patent
Takiguchi et al.

(10) Patent No.: US 8,916,074 B2
(45) Date of Patent: Dec. 23, 2014

(54) METHOD FOR MAKING RESIN HOLLOW BODY AND AIR FLOW MEASURING DEVICE

(75) Inventors: Tomoyuki Takiguchi, Okazaki (JP); Akiyuki Sudou, Takahama (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/533,249

(22) Filed: Jun. 26, 2012

(65) Prior Publication Data

US 2012/0325011 A1 Dec. 27, 2012

(30) Foreign Application Priority Data

Jun. 27, 2011 (JP) ................................. 2011-141863

(51) Int. Cl.
- *B29C 45/14* (2006.01)
- *G01F 15/00* (2006.01)
- *G01F 1/684* (2006.01)
- *B29C 45/00* (2006.01)

(52) U.S. Cl.
CPC ............ *G01F 1/6842* (2013.01); *G01F 15/006* (2013.01); *B29C 45/0062* (2013.01); *B29C 2045/14524* (2013.01); *B29C 2045/0063* (2013.01)
USPC .............................. 264/251; 264/255; 73/861

(58) Field of Classification Search
CPC ............. B29C 2045/0063; B29C 2045/14524; B29C 45/0062; B29C 45/14; B29C 66/0054; G01F 1/6842
USPC .............................. 264/251, 255, 273; 73/861
See application file for complete search history.

(56) References Cited

U.S. PATENT DOCUMENTS

| | | | | |
|---|---|---|---|---|
| 5,941,284 A | * | 8/1999 | Gasami et al. | 138/111 |
| 7,291,302 B2 | * | 11/2007 | Koyama et al. | 264/255 |
| 7,588,809 B2 | * | 9/2009 | Nishida | 428/35.7 |
| 2003/0111765 A1 | * | 6/2003 | Ichikawa et al. | 264/248 |
| 2004/0159298 A1 | * | 8/2004 | Ino et al. | 123/184.21 |

(Continued)

FOREIGN PATENT DOCUMENTS

| | | |
|---|---|---|
| JP | 62-087315 | 4/1987 |
| JP | 6-246781 | 9/1994 |

(Continued)

OTHER PUBLICATIONS

Office Action (2 pages) dated Apr. 9, 2013, issued in corresponding Japanese Application No. 2011-141863 and English translation (2 pages).

*Primary Examiner* — Jill Heitbrink
(74) *Attorney, Agent, or Firm* — Nixon & Vanderhye, P.C.

(57) ABSTRACT

According to a method for making a resin hollow body, in a primary-formation process, molten resin is injected into spaces defined by dies to form resin components. In a die-moving process, each component is held in at least one die. Joining edges of the components are brought close through relative movement of the dies to make a predetermined arrangement of the components. In a secondary-formation process, molten resin is injected into a region where the edges are adjacent. The edges are joined to form an outer wall, partition wall, and hollow portion of the hollow body. At least one of the edges constituting the partition wall includes a linear groove. In the die-moving process, the partition-wall-constituting edges are brought into contact to define by the groove a linear hollow cavity surrounded with the edges. In the secondary-formation process, the cavity is filled with molten resin to join the partition-wall-constituting edges.

3 Claims, 5 Drawing Sheets

(56) References Cited

U.S. PATENT DOCUMENTS

2006/0038319 A1* 2/2006 Arai et al. .................. 264/251
2009/0126477 A1* 5/2009 Saito et al. ................ 73/204.25
2010/0242589 A1* 9/2010 Morino et al. ............. 73/202.5

FOREIGN PATENT DOCUMENTS

| JP | 11-258019 | | 9/1999 |
|---|---|---|---|
| JP | 2000-282989 | * | 10/2000 |
| JP | 2006-234766 | | 9/2006 |

* cited by examiner

METHOD FOR MAKING RESIN HOLLOW BODY AND AIR FLOW MEASURING DEVICE

CROSS REFERENCE TO RELATED APPLICATION

This application is based on Japanese Patent Application No. 2011-141863 filed on Jun. 27, 2011, the disclosure of which is incorporated herein by reference.

TECHNICAL FIELD

The present disclosure relates to a method for making a resin hollow body and to an air flow measuring device including the resin hollow body made by the method.

BACKGROUND

Conventionally, a thermal-type air flow measuring device for measuring an air flow rate by use of heat transfer from a heating element to a flow of air is widely known. This air flow measuring device is employed, for example, for measuring a flow rate of intake air taken into an internal combustion engine. In the air flow measuring device, a sensing part is configured by disposing an element such as a heating element on a semiconductor substrate in the light of improvement in responsivity and improvement in measurement accuracy. The air flow measuring device is obtained by inserting a subassy holding this sensing part into a housing, which defines a passage of air.

The housing of the air flow measuring device is a hollow body made of resin and having a hollow portion, and the hollow portion is used as, for example, the passage of air. For this reason, the housing is obtained for example, by injection-molding components made of resin for forming the hollow portion, and then, by joining together the respective resin components through adhesive bonding (see, for example, JP-A-H11-258019 and JP-A-2006-234766). However, the adhesive may protrude into the hollow portion, and the flow of air in the hollow portion may be disturbed due to the protruded adhesive.

For a method for making the resin hollow body, in addition to the joining method through the adhesive, a method referred to as a die slide injection molding (abbreviated as DSI) method is widely known (see, for example, Japanese Patent No. 3263167).

The DSI method includes, for example, a primary formation process in which resin components defining a hollow portion (hereinafter referred to as half hollow bodies) are formed through injection-molding; a die moving process in which with the respective half hollow bodies held in dies used in the primary formation process, joining edges of the half hollow bodies are brought close to each other by movements of dies relative to each other to give the half hollow bodies a predetermined arrangement; and a secondary formation process in which molten resin is injected into a region where the joining edges of the half hollow bodies are adjacent to each other, and the joining edges are joined together.

As a result of these processes, according to the DSI method, the half hollow bodies which are injection-molded in the primary formation process can quickly be joined together in the secondary formation process before, for example, warping deformation after the formation is caused. Accordingly, by using the DSI method for the method of making the housing of the air flow measuring device, problems caused by the protrusion of the adhesive can be solved, and reduction of manufacturing man hours, quality improvement in joining portions and so forth can be achieved.

When a flow rate of air with pulsation is measured by the thermal-type air flow measuring device, a negative-side measurement error, whereby the measured value becomes lower than a true value because the measuring method is of the thermal type, is caused. For this reason, to reduce the negative-side measurement error as a result of the measurement of pulsation, it is necessary that a passage in the housing be formed so as to have a curved part and the sensing part project into the passage. Accordingly, the resin hollow body as a housing includes a partition wall that projects into the hollow portion to divide the hollow portion, in addition to an outer wall that divides the hollow portion from the outside of the body. The curved part of the passage is defined by the partition wall.

Since the partition wall is provided by the joining or contact of the joining edges, if, for example, a joining at the partition wall, is insufficient, a leakage of air at the partition wall is caused. As a result, a part of air introduced into the housing does not pass through the curved part and takes a shortcut, which has an adverse effect on the measurement. Therefore, when the DSI method is employed as a production method of the housing, reliability of prevention against an air leak at the partition wall needs to be enhanced.

SUMMARY

According to the present disclosure, there is provided a method for making a resin hollow body including a hollow portion, an outer wall that divides the hollow portion from outside of the resin hollow body, and a partition wall that projects into the hollow portion to separate the hollow portion. According to the method, a primary-formation process is performed. In the primary-formation process, a plurality of dies are provided. In addition, molten resin is injected into spaces defined by the plurality of dies to form a plurality of resin components. Furthermore, a die-moving process is performed. In the die-moving process, each of the plurality of resin components is held in at least one of the plurality of dies. Additionally, joining edges of the plurality of resin components are brought close to each other through relative movement of the at least one of the plurality of dies, to make a predetermined arrangement of the plurality of resin components. Moreover, a secondary-formation process is performed. In the secondary-formation process, molten resin is injected into a region where the joining edges of the plurality of resin components are adjacent to each other. In addition, the joining edges are joined together to form the outer wall, the partition wall, and the hollow portion. At least one of the joining edges that constitute the partition wall includes a groove having a shape of a continuous line. In the die-moving process, the joining edges that constitute the partition wall are brought into contact with each other to define a hollow cavity by the groove. The hollow cavity is surrounded with the joining edges and has the shape of the continuous line. In the secondary-formation process, the hollow cavity is filled with molten resin to join together the joining edges that constitute the partition wall.

According to the present disclosure, there is also provided an air flow measuring device including the resin hollow body that is made by the method and a sensor. The sensor is disposed in the hollow portion of the resin hollow body and configured to detect a flow rate of air introduced into the hollow portion.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

According to a method of an embodiment for making a resin hollow body including a hollow portion, an outer wall that divides the hollow portion from outside of the resin hollow body, and a partition wall that projects into the hollow portion to separate the hollow portion, a primary-formation process is performed. In the primary-formation process, a plurality of dies are provided. In addition, molten resin is injected into spaces defined by the plurality of dies to form a plurality of resin components (half hollow bodies). Furthermore, a die-moving process is performed. In the die-moving process, each of the plurality of resin components is held in at least one of the plurality of dies. Additionally, joining edges of the plurality of resin components are brought close to each other through relative movement of the at least one of the plurality of dies, to make a predetermined arrangement of the plurality of resin components. Moreover, a secondary-formation process is performed. In the secondary-formation process, molten resin is injected into a region where the joining edges of the plurality of resin components are adjacent to each other. In addition, the joining edges are joined together to form the outer wall, the partition wall, and the hollow portion. At least one of the joining edges that constitute the partition wall includes a groove having a shape of a continuous line. In the die-moving process, the joining edges that constitute the partition wall are brought into contact with each other to define a hollow cavity by the groove. The hollow cavity is surrounded with the joining edges and has the shape of the continuous line. In the secondary-formation process, the hollow cavity is filled with molten resin to join together the joining edges that constitute the partition wall.

In the primary-formation process, each of the plurality of resin components is formed to include a hole that communicates with the hollow cavity when the hollow cavity is defined. The hole opens on each of the joining edges that constitute the partition wall. In addition, an air flow measuring device of the embodiment includes the resin hollow body that is made by the method of the embodiment and a sensor. The sensor is disposed in the hollow portion of the resin hollow body and configured to detect a flow rate of air introduced into the hollow portion.

Configuration of the air flow measuring device of the embodiment will be described below. Configurations of a hollow body 1 made of resin, and an air flow measuring device 3 including the resin hollow body 1 as its housing 2, in accordance to the embodiment will be explained with reference to FIGS. 1 to 4. The air flow measuring device 3 employs a thermal-type measuring method for measuring an air flow rate by use of a heat transfer from a heating element (not shown) to an airflow. The device 3 is disposed for example, in an intake passage 4 leading to an internal combustion engine (not shown). The device 3 measures a flow rate of intake air taken into the engine. The resin hollow body 1 includes a hollow portion 6 formed by joining together two resin components (half-hollow bodies) 5 (which may be hereinafter referred to separately as numerals 5a, 5b). The hollow body 1 serves as the housing 2 of the air flow measuring device 3, and the hollow portion 6 serves as a passage 7 of intake air.

Figure 1:
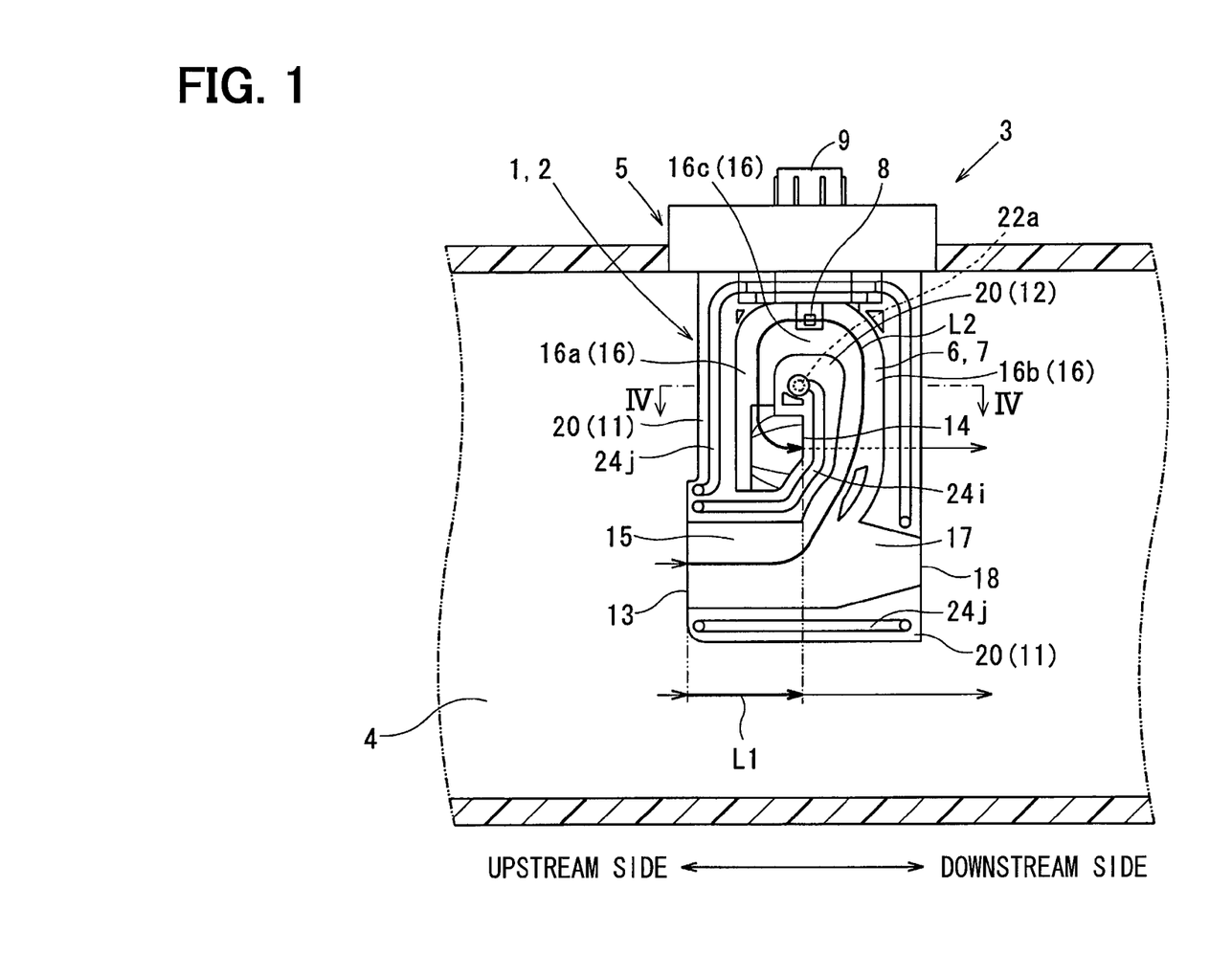
FIG. 1 is a sectional view illustrating inside of an air flow measuring device in accordance with an embodiment.
Figure 2A:
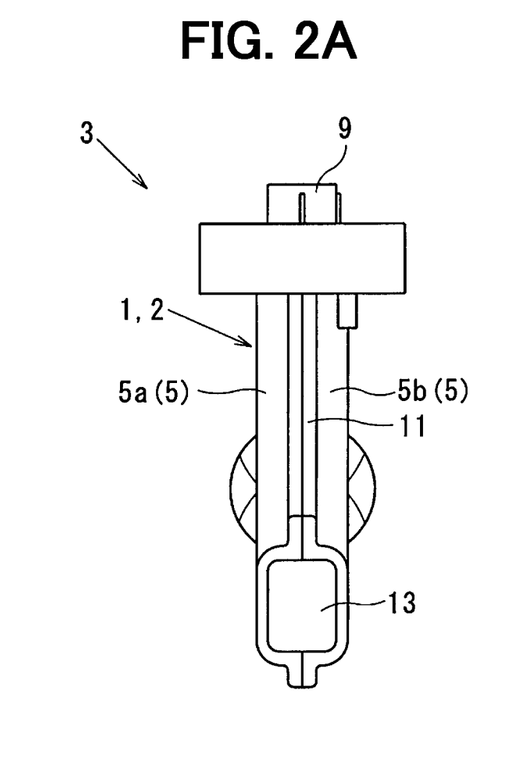
FIG. 2A is a rear view illustrating the air flow measuring device of the embodiment.
Figure 2B:
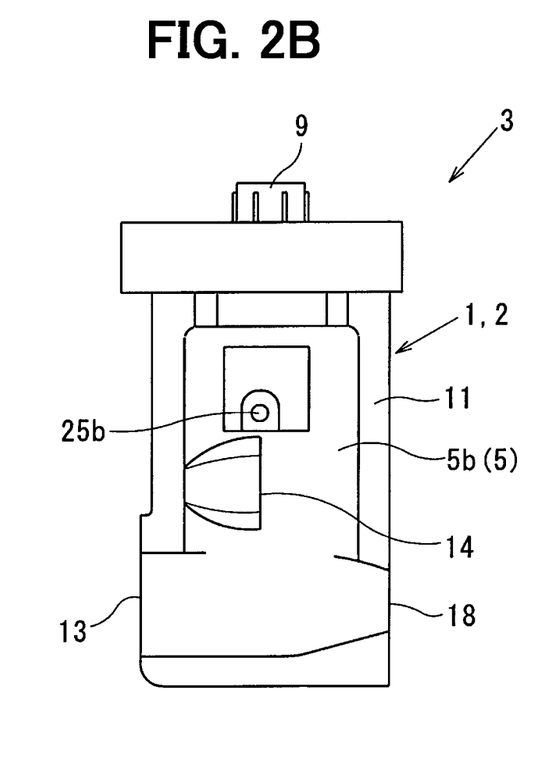
FIG. 2B is a side view illustrating the air flow measuring device of the embodiment.
Figure 3:
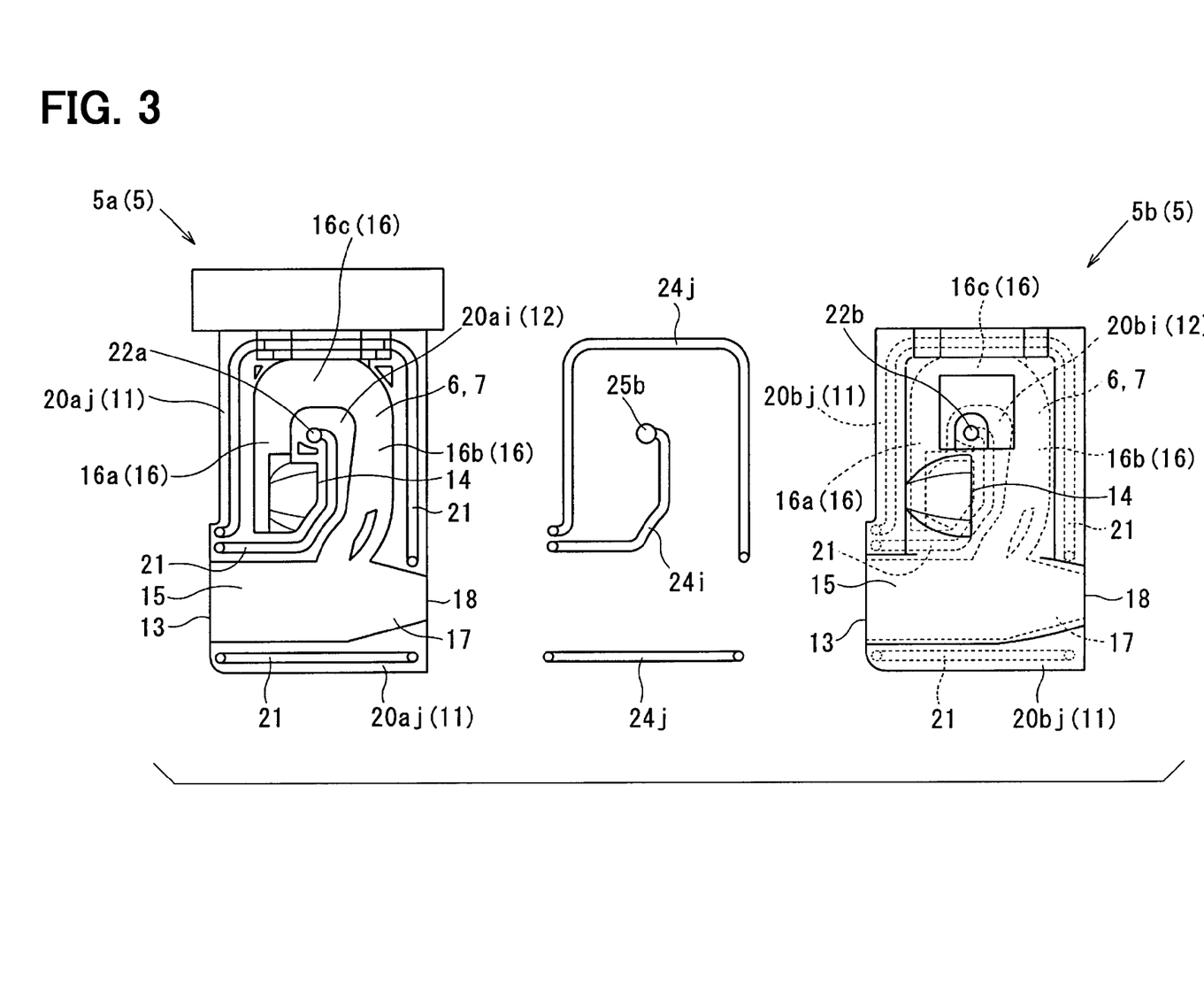
FIG. 3 is an exploded development view illustrating a resin hollow body in accordance with the embodiment.
Figure 4:
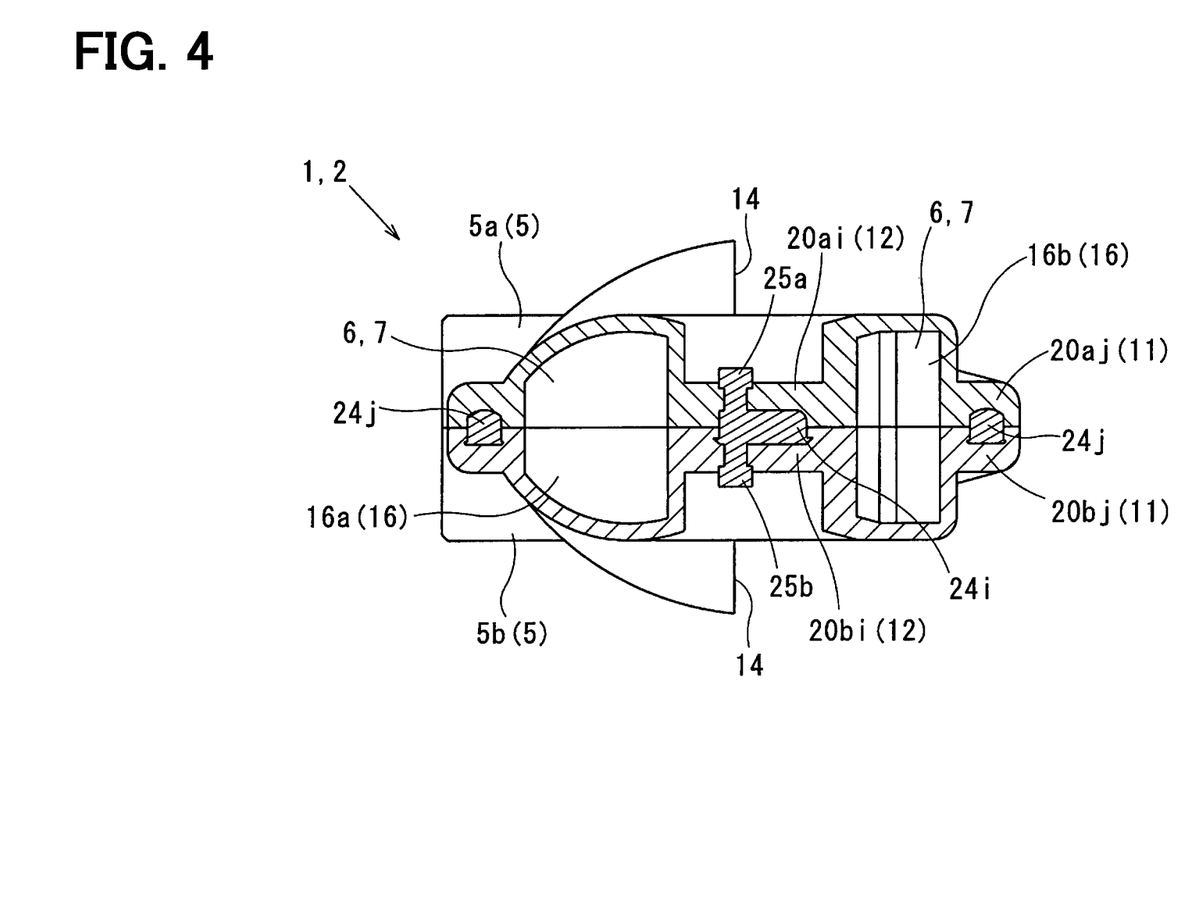
FIG. 4 is a cross-sectional view taken along a line IV-IV in FIG. 1.

A sensing part 8 of the air flow measuring device 3 is configured by disposing an element such as a heating element on a semiconductor substrate in the light of improvement in responsivity and improvement in measurement accuracy. The sensing part 8 is held by one subassy 9. The air flow measuring device 3 is provided by inserting the subassy 9 into the housing 2 such that the sensing part 8 is exposed to the passage 7 of air. As a result of its above-described configuration, the air flow measuring device 3 takes a part of intake air which flows through the intake passage 4 into the passage 7, and at the sensing part 8, the device 3 generates and outputs an electrical signal corresponding to the flow rate of intake air.

In the flow of intake air in the intake passage 4, a pulsation is inevitably produced in accordance with opening and closing of a valve of the engine. When measuring a flow rate of air with the pulsation by the air flow measuring device 3, a negative-side measurement error, whereby the measured value becomes lower than a true value is made due to the thermal-type measuring method. For this reason, to reduce the negative-side measurement error as a result of the measurement of pulsation, it is necessary that the passage 7 in the housing 2 be formed so as to have a curved part and the sensing part 8 project into the passage 7. Accordingly, the resin hollow body 1 as the housing 2 includes a partition wall 12 that projects into the hollow portion 6 to divide the hollow portion 6, in addition to an outer wall 11 that divides the hollow portion 6 from the outside of the body 1. The curved part of the passage is defined by the partition wall 12.

More specifically, the passage 7 formed in the housing 2 includes an inlet 13 of intake air that opens toward an upstream side of the intake passage 4; an outlet 14 of intake air that opens toward an downstream side of the intake passage 4; a straight passage 15 that extends linearly from the inlet 13 to make the air flow straight in the same direction as the intake air flowing through the intake passage 4 in a forward direction; and a circulation passage 16 that makes flow around the intake air flowing straight through the straight passage 15 to divert the air into the outlet 14. The partition wall 12 is provided to divide the straight passage 15 from a downstream part 16a of the circulation passage 16 as well as to divide the downstream part 16a from an upstream part 16b of the circulation passage 16.

A dust discharge passage 17 for discharging dust is connected linearly to the straight passage 15. A downstream end of the dust discharge passage 17 serves as a dust discharge port 18 that opens toward a downstream side of the intake passage 4.

For the convenience of insertion of the subassy 9 into the housing 2, the sensing part 8 projects into the most rear position of the circulation passage 16, i.e., into an intermediate part 16c that is the farthest from the straight passage 15 and connects together the downstream part 16a and the upstream part 16b in the circulation passage 16. A flow of air in the intermediate part 16c is opposite from a flow in the straight passage 15 or a flow of intake air in the intake passage 4. The circulation passage 16 branches into two passages at the downstream part 16a, and the two outlets 14 are provided.

Because of the above configuration, the air flow measuring device 3 is not influenced directly by disturbance of a flow in the intake passage 4, and can output the electrical signal in accordance with the measured value with less variation, as a result of the arrangement of the sensing part 8 in the passage 7 inside the housing 2 instead of the location of the sensing part 8 directly in the intake passage 4.

With passage length in a case where the air is not taken into the housing 2 and flows straight through the intake passage 4 set at L1, and with passage length of the passage 7 set at L2, the air flow measuring device 3 increases the measured value in accordance with L2/L1 as a result of the arrangement of the sensing part 8 in the passage 7 inside the housing 2, to reduce the negative-side measurement error caused by the pulsation of intake air. By setting L2/L1 at a desired value with the circulation passage 16, the air flow measuring device 3 solves the negative-side measurement error at the time of measurement of pulsating flow made because of the thermal-type measuring method.

The method for making the resin hollow body 1 of the embodiment will be described in reference to FIGS. 1 to 5D. The method for making the resin hollow body 1 is a "DSI method", and includes the following processes.

Figures 5A, 5B:
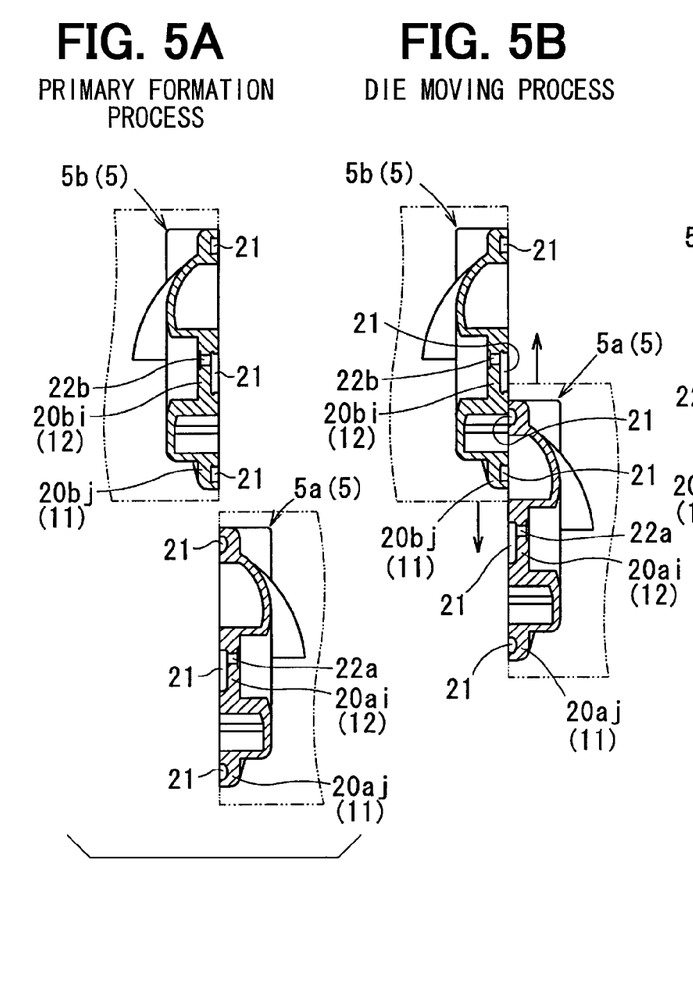
FIG. 5A is a diagram illustrating a primary formation process of a DSI method in reference to the cross-sectional view taken along the line IV-IV in FIG. 3.
FIG. 5B is a diagram illustrating a die moving process of the DSI method in reference to the cross-sectional view taken along the line IV-IV in FIG. 3.
Figures 5C, 5D:
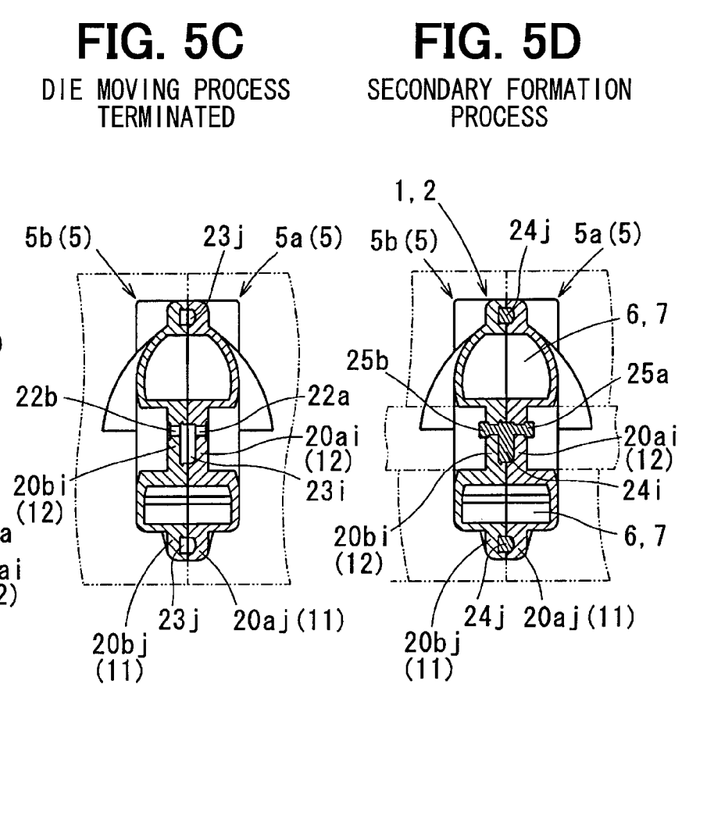
FIG. 5C is a diagram illustrating termination of the die moving process of the DSI method in reference to the cross-sectional view taken along the line IV-IV in FIG. 3.
FIG. 5D is a diagram illustrating a secondary formation process of the DSI method in reference to the cross-sectional view taken along the line IV-IV in FIG. 3.

As illustrated in FIGS. 5A to 5C, the method for making the resin hollow body 1 includes a primary formation process in which molten resin is injected into a space formed by dies so as to form two half hollow bodies 5a, 5b; a die moving process in which with the half hollow bodies 5a, 5b held respectively in the dies, a joining edge 20 of the half hollow body 5a and the joining edge 20 of the half hollow body 5b are brought close to each other through relative displacement between the dies so as to give a predetermined arrangement to the half hollow bodies 5a, 5b; and a secondary formation process in which molten resin is injected into a region where the joining edges 20 of the half hollow bodies 5a, 5b are adjacent to each other so as to join together the joining edges 20. The outer wall 11 and the partition wall 12 are provided by joining together the joining edges 20 in the secondary formation process.

In the primary formation process, the half hollow bodies 5a, 5b are formed to respectively have joining edges 20aj, 20bj which constitute the outer wall 11; and joining edges 20ai, 20bi which constitute the partition wall 12. Linear grooves 21 having continuous line shapes are formed on all of the joining edges 20aj, 20bj and the joining edges 20ai, 20bi. Holes 22a, 22b that open into the groove 21 are provided respectively for the joining edges 20ai, 20bi. In addition, the holes 22a, 22b are formed to pass respectively through the joining edges 20ai, 20bi.

Next, in the die moving process, a linear hollow cavity 23j having a continuous line shape that is obtained by coupling together the groove 21 on the joining edge 20aj-side and the groove 21 on the joining edge 20bj-side as a result of the contact between the joining edges 20aj, 20bj is defined; and as well, a linear hollow cavity 23i having a continuous line shape that is obtained by coupling together the groove 21 on the joining edge 20ai-side and the groove 21 on the joining edge 20bi-side through the contact of the joining edges 20ai, 20bi is defined (see FIG. 5C). The hollow cavity 23j is enclosed with the joining edges 20aj, 20bj and closed off the outside of the housing 2, and the hollow cavity 23i is enclosed by the joining edges 20ai, 20bi and closed off the outside. In addition, the holes 22a, 22b open into the hollow cavity 23i, and communicate between the hollow cavity 23i and the outside.

The holes 22a, 22b are provided to correspond respectively to positions of the joining edges 20ai, 20bi where the vicinity of a boundary between the downstream part 16a and the intermediate part 16c of the circulation passage 16 is formed (see FIG. 1). Furthermore, the holes 22a, 22b are formed to have reflective symmetry with respect to the joining edges 20ai, 20bi.

In the secondary formation process, a linear secondary molded part 24j, which generally conforms to the hollow cavity 23j, is formed by filling the hollow cavity 23j with molten resin, and the joining edges 20aj, 20bj are joined together by the secondary molded part 24j so as to form the outer wall 11. By filling the hollow cavity 23i with molten resin, a linear secondary molded part 24i having a continuous line shape that generally accords with the hollow cavity 23i is formed. The joining edges 20ai, 20bi are coupled together by the secondary molded part 24i so as to form the partition wall 12.

The molten resin injected into the hollow cavity 23i flows into the holes 22a, 22b, and flows outward respectively of the holes 22a, 22b so as to form outer expanded parts 25a, 25b having larger diameters than the holes 22a, 22b. Accordingly, the secondary molded part 24i includes the outer expanded parts 25a, 25b which are swollen to the outside of the joining edges 20ai, 20bi. As a result, the joining edges 20ai, 20bi are welded and joined together by the linear part of the secondary molded part 24i, and clamped between the outer expanded parts 25a, 25b.

Effects of the embodiment will be described. In the air flow measuring device 3 of the embodiment, the outer wall 11 and the partition wall 12 of the resin hollow body 1 used as the housing 2 of the device 3 are provided by welding and joining together the joining edges 20 in the secondary formation process of the DSI method. In the primary formation process, the linear grooves 21 are formed respectively on the joining edges 20ai, 20bi, which constitute the partition wall 12; and in the die moving process, by bringing into contact the joining edges 20ai, 20bi, the linear hollow cavity 23i, which is obtained as a result of coupling together the two grooves 21, is defined. The hollow cavity 23i is closed off the outside inside the partition wall 12, and in the secondary formation process, by filling the hollow cavity 23i with the molten resin to form the linear secondary molded part 24i, the joining edges 20ai, 20bi are welded and joined together.

Accordingly, the secondary molded part 24i can be arranged along the straight passage 15 and the circulation passage 16, and reliability of prevention against an air leak through the partition wall 12 can thus be improved. The reliability of prevention against the air leak at the partition wall 12 is extremely important in terms of the following respects.

For the convenience of insertion of the subassy 9 into the housing 2, the sensing part 8 projects into the intermediate part 16c which is the most rear position of the circulation passage 16 and is the farthest from the straight passage 15. Consequently, the reliability of the partition wall 12 in prevention against the air leak becomes extremely important in order to reliably guide the air taken in from the inlet 13 to the intermediate part 16c on the rear side. In addition, the air flow measuring device 3 solves the negative-side measurement error at the time of measurement of the pulsating flow by setting L2/L1 at a desired value using the circulation passage 16. For this reason, to reliably set the length of the passage of air at L2 in the housing 2, the reliability of the partition wall 12 in prevention against the air leak becomes extremely important.

As described above, the reliability of the partition wall 12 in prevention against the air leak is extremely important in reliably guiding the air taken into the housing 2 to the sensing part 8 and in reliably solving the measurement error on the negative-side. Therefore, reliability of the measured value of the air flow measuring device 3 can be improved by enhancing the reliability of prevention against the air leak at the partition wall 12. Additionally, by making relatively thick the joining edges 20*ai*, 20*bi* so as to withstand injection pressure of the molten resin in the secondary formation process, the linear secondary molded part 24*i* is enclosed in the partition wall 12, so that the linear secondary molded part 24*i* cannot be exposed to a wall surface of the partition wall 12.

The joining edges 20*ai*, 20*bi* are provided respectively with the holes 22*a*, 22*b* that open into the groove 21, and the holes 22*a*, 22*b* communicate with the hollow cavity 23*i* upon formation of the hollow cavity 23*i*. Accordingly, the secondary molded part 24*i* is formed into branches to project into the inside of the half hollow bodies 5*a*, 5*b*. As a result, even if the secondary molded part 24*i* is exfoliated from the groove 21, for example, separation of the half hollow bodies 5*a*, 5*b* can be prevented by the engagement of the molded part 24*i* with the half hollow bodies 5*a*, 5*b*.

The holes 22*a*, 22*b* are formed to pass respectively through the joining edges 20*ai*, 20*bi*, and communicate between the hollow cavity 23*i* and the outside of the housing 2 upon formation of the hollow cavity 23*i*. Accordingly, the secondary molded part 24*i* is provided to include the outer expanded parts 25*a*, 25*b* which are swollen to the outside of the joining edges 20*ai*, 20*bi*, and the joining edges 20*ai*, 20*bi* are sandwiched between the outer expanded parts 25*a*, 25*b*. For this reason, as a result of the clamping of the joining edges 20*ai*, 20*bi* between the outer expanded parts 25*a*, 25*b*, the reliability of prevention against the air leak through the partition wall 12 can be further improved.

Modifications of the above embodiment will be described. The mode of the resin hollow body 1 and the air flow measuring device 3 is not limited to the above embodiment, and there can be various modifications. For example, in the resin hollow body 1 of the embodiment, the groove 21 is provided for both of the joining edges 20*ai*, 20*bi*. Alternatively, the groove 21 may be formed for only one of the joining edges 20*ai*, 20*bi*, and for example, a linear elevated part with which to fill up the groove 21 may be provided for the other one of the edges 20*ai*, 20*bi*. The hollow cavity 23*i* may be formed by the groove 21 and the elevated part.

The resin hollow body 1 of the embodiment is formed by joining together the two half hollow bodies 5*a*, 5*b*. Alternatively, the resin hollow body 1 may be formed by joining of three or more half hollow bodies 5. In this case, the hollow cavity 23*i* may be defined by three or more joining edges 20. Furthermore, according to the air flow measuring device 3 of the embodiment, in the sensing part 8, the element such as a heating element is disposed on the semiconductor substrate. Alternatively, instead of being disposed on the semiconductor substrate, the element such as a heating element may be configured as a single body and disposed in the passage 7.

To sum up, the method for making the resin hollow body 1 and the air flow measuring device 3 in accordance with the above embodiment can be described as follows.

A method is for making a resin hollow body 1 including a hollow portion 6, an outer wall 11 that divides the hollow portion 6 from outside of the resin hollow body 1, and a partition wall 12 that projects into the hollow portion 6 to separate the hollow portion 6. According to the method, a primary-formation process is performed. In the primary-formation process, a plurality of dies are provided. In addition, molten resin is injected into spaces defined by the plurality of dies to form a plurality of resin components 5*a*, 5*b*. Furthermore, a die-moving process is performed. In the die-moving process, each of the plurality of resin components 5*a*, 5*b* is held in at least one of the plurality of dies. Additionally, joining edges 20; 20*ai*, 20*bi*; 20*aj*, 20*bj* of the plurality of resin components 5*a*, 5*b* are brought close to each other through relative movement of the at least one of the plurality of dies, to make a predetermined arrangement of the plurality of resin components 5*a*, 5*b*. Moreover, a secondary-formation process is performed. In the secondary-formation process, molten resin is injected into a region where the joining edges 20; 20*ai*, 20*bi*; 20*aj*, 20*bj* of the plurality of resin components 5*a*, 5*b* are adjacent to each other. In addition, the joining edges 20; 20*ai*, 20*bi*; 20*aj*, 20*bj* are joined together to form the outer wall 11, the partition wall 12, and the hollow portion 6. At least one of the joining edges 20*ai*, 20*bi* that constitute the partition wall 12 includes a groove 21 having a shape of a continuous line. In the die-moving process, the joining edges 20*ai*, 20*bi* that constitute the partition wall 12 are brought into contact with each other to define a hollow cavity 23*i* by the groove 21. The hollow cavity 23*i* is surrounded with the joining edges 20*ai*, 20*bi* and has the shape of the continuous line. In the secondary-formation process, the hollow cavity 23*i* is filled with molten resin to join together the joining edges 20*ai*, 20*bi* that constitute the partition wall 12.

Accordingly, the linear secondary molded part 24*i*, which is formed in the secondary formation process, can be arranged along the passage 7 in the housing 2. The reliability of prevention against an air leak through the partition wall 12 can thus be improved. Additionally, by making relatively thick the joining edges 20*ai*, 20*bi* so as to withstand injection pressure of the molten resin in the secondary formation process, the linear secondary molded part 24*i* is enclosed in the partition wall 12, so that the linear secondary molded part 24*i* cannot be exposed to a wall surface of the partition wall 12.

In the primary-formation process, each of the plurality of resin components 5*a*, 5*b* may be formed to include a hole 22*a*, 22*b* that communicates with the hollow cavity 23*i* when the hollow cavity 23*i* is defined. The hole 22*a*, 22*b* opens on each of the joining edges 20*ai*, 20*bi* that constitute the partition wall 12. Accordingly, in the secondary formation process, the molten resin flows into the holes 22*a*, 22*b*, and is solidified, so that the secondary molded part 24*i* is formed into branches to project into the inside of the half hollow bodies 5*a*, 5*b*. As a result, even if the secondary molded part 24*i* is exfoliated from the groove 21, for example, separation of the half hollow bodies 5*a*, 5*b* can be prevented by the engagement of the molded part 24*i* with the half hollow bodies 5*a*, 5*b*.

An air flow measuring device 3 includes the resin hollow body 1 that is made by the method and a sensor 8. The sensor 8 is disposed in the hollow portion 6 of the resin hollow body 1 and configured to detect a flow rate of air introduced into the hollow portion 6. In this aspect, the resin hollow body 1, which is produced by the above-described production method, is used as the housing 2 of the air flow measuring device 3; and the hollow portion 6 is used as the passage 7 of air, for example. Accordingly, by employing the resin hollow body 1 having a high reliability of prevention against an air leak through the partition wall 12, for the housing 2, the reliability of the air flow measuring device 3 can be improved.

Additional advantages and modifications will readily occur to those skilled in the art. The disclosure in its broader terms is therefore not limited to the specific details, representative apparatus, and illustrative examples shown and described.

What is claimed is:

1. A method for making a resin hollow body having an inlet and an outlet including a hollow portion, an outer wall that divides the hollow portion from outside of the resin hollow body, and a partition wall that projects into the hollow portion to separate the hollow portion between a straight passage and a circulation passage that makes air which is introduced from the inlet and flows straight through the straight passage, flow around to divert the air into the outlet, the method comprising:

performing a primary-formation process, wherein the performing of the primary-formation process includes:

providing a plurality of dies; and injecting molten resin into spaces defined by the plurality of dies to form a plurality of resin components;

performing a die-moving process, wherein the performing of the die-moving process includes:

holding each of the plurality of resin components in at least one of the plurality of dies; and bringing joining edges of the plurality of resin components close to each other through relative movement of the at least one of the plurality of dies, to make a predetermined arrangement of the plurality of resin components; and performing a secondary-formation process, wherein the performing of the secondary-formation process includes:

injecting molten resin into a region where the joining edges of the plurality of resin components are adjacent to each other; and joining together the joining edges to form the outer wall, the partition wall, and the hollow portion, wherein:

at least one of the joining edges that constitute the partition wall includes a linear groove along the straight passage and the circulation passage;

the performing of the die-moving process further includes bringing the joining edges that constitute the partition wall into contact with each other to define a hollow cavity by the groove, the hollow cavity surrounded with the joining edges;

the performing of the secondary-formation process further includes filling the hollow cavity with molten resin to join together the joining edges that constitute the partition wall and to form a secondary molded part along the straight passage and the circulation passage; and an other end portion of the hollow cavity is configured as an outlet for molten resin.

2. The method according to claim 1, wherein:

the performing of the primary-formation process further includes forming each of the plurality of resin components to include a hole that communicates with the hollow cavity when the hollow cavity is defined; and the hole opens on each of the joining edges that constitute the partition wall.

3. An air flow measuring device comprising:

the resin hollow body that is made by the method according to claim 1; and a sensor that is disposed in the hollow portion of the resin hollow body and configured to detect a flow rate of air introduced into the hollow portion.

* * * * *